United States Patent
Morovic et al.

(10) Patent No.: US 10,893,172 B2
(45) Date of Patent: Jan. 12, 2021

(54) COLOR CALIBRATION

(71) Applicant: HEWLETT-PACKARD DEVELOPMENT COMPANY, L.P., Spring, TX (US)

(72) Inventors: Peter Morovic, San Cugat del Valles (ES); Jan Morovic, London (GB); Hector Gomez Minano, San Cugat del Valles (ES); Javier Maestro Garcia, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/327,398

(22) PCT Filed: Oct. 24, 2016

(86) PCT No.: PCT/US2016/058494
§ 371 (c)(1),
(2) Date: Feb. 22, 2019

(87) PCT Pub. No.: WO2018/080427
PCT Pub. Date: May 3, 2018

(65) Prior Publication Data
US 2019/0238723 A1    Aug. 1, 2019

(51) Int. Cl.
*H04N 1/60* (2006.01)
*B41J 2/525* (2006.01)

(52) U.S. Cl.
CPC .............. *H04N 1/605* (2013.01); *B41J 2/525* (2013.01); *H04N 1/60* (2013.01)

(58) Field of Classification Search
CPC ............ B41J 2/525; H04N 1/605; H04N 1/60
See application file for complete search history.

(56) References Cited

U.S. PATENT DOCUMENTS

| 5,357,448 A | 10/1994 | Stanford |
| 8,964,221 B2 * | 2/2015 | Sato ................... G03G 15/5062 358/1.15 |
| 2007/0086026 A1 | 4/2007 | Huang et al. |
| 2010/0157337 A1 | 6/2010 | Akado et al. |
| 2010/0214576 A1 | 8/2010 | Morovic et al. |

(Continued)

OTHER PUBLICATIONS

Deshpande, K., et al, Characterisation of the N-colour Printing Process Using the Spot Colour Overprint Model, Dec. 16, 2014.

(Continued)

*Primary Examiner* — Thinh H Nguyen
(74) *Attorney, Agent, or Firm* — HP Inc. Patent Department (57) ABSTRACT

A method of obtaining a calibration factor for color calibration of a printing system. The method includes printing, using the printing system, a plurality of Neugebauer primaries (NPs) each defined by a respective Neugebauer primary area coverage (NPac) vector. For each of the NPs, an area coverage change of the NP is determined from a measurement of a visual property for the NP and a measurement of the visual property for a corresponding reference NP corresponding to the respective NPac vector. The calibration N factor for the printing system is obtained based on the area coverage change for respective NPs of the plurality of NPs.

20 Claims, 3 Drawing Sheets

(56) References Cited

U.S. PATENT DOCUMENTS

2013/0021631 A1 1/2013 Nachlieli et al.
2016/0080612 A1 3/2016 Martinez de Salinas Vazquez et al.

OTHER PUBLICATIONS

Oztan, B., et al., Conditions for Color Misregistration Sensitivity in Clustered-dot Halftones, 2007.
Bugnon, et al. Recovering Neugebauer Colorant Reflectances and Ink Spreading Curves From Printed Color Images, Feb. 10, 2011.
Slavuj, R. et al., Estimating Neugebauer Primaries for Multi-channel Spectral Printing Modeling, Feb. 24, 2014.
Viggiano, J.A.S., Modeling the Color of Multi-colored Halftones, 2015.

* cited by examiner

COLOR CALIBRATION

BACKGROUND

A typical printing apparatus is based on a subtractive color model and uses subtractive colorants such as, for example, C (cyan), M (magenta), Y (yellow) and K (black) inks. By overprinting images for each of the colorants or inks, an image with a range of different colors can be printed. In an example printing pipeline, individual inks may be calibrated separately so that printed colors are similar to or match desired colors. However, these calibration methods may not accurately calibrate the inks. The printed image may therefore be a different color than desired.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for the purpose of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color calibration of a printing system. Color calibration may for example be used to adjust the color response of the printing system to more accurately correspond to a desired color to be printed. Color calibration may be used to calibrate a color mapping process by which a first representation of a given color is mapped to a second representation of the same color. Although "color" is a concept that is understood intuitively by human beings, it can be represented in a large variety of ways. For example, in one case, a color as observed visually by an observer may be related to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. Other color spaces include: a Cyan, Magenta, Yellow and Black (CMYK) color space, in which four variables are used in a subtractive color model to represent different quantities of colorant or ink, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other spaces include area coverage spaces, such as the Neugebauer Primary area coverage (NPac) space. This may be deemed a print control space that controls a color output of an imaging device. It may also be considered, in certain cases, to correspond to a color space. An NPac vector in the NPac space represents a statistical distribution of one or more Neugebauer Primary (NP) vectors over an area of a halftone. In a simple binary (bi-level, i.e. two drop state: "drop" or "no drop") printer, an NP is one of $2^k$ combinations of k inks within the printing system. For example, if a printing device uses CMY inks there can be eight NPs. These NPs relate to the following: C, M, Y, C+M, C+Y, M+Y, C+M+Y, and W (white or blank indicating an absence of ink). As may be seen, an NP may comprise an overprint of two available inks, such as a drop of Magenta on a drop of Cyan (for a bi-level printer) in a common addressable print area (e.g. a printable "pixel"). Other examples may also incorporate multi-level printers, e.g. where print heads are able to deposit N drop levels, for example via multiple print passes or print-bars; in this case an NP may include one of $N^k$ combinations of k inks within the printing system. An NPac space provides a large number of metamers. Metamerism is the existence of a multitude of combinations of reflectance and emission properties that result in the same perceived color for a fixed illuminant and observer.

Each NPac vector may therefore define the probability distribution for one or more colorant or ink combinations for each pixel in the halftone (e.g. a likelihood that a particular colorant or ink combination is to be placed at each pixel location in the halftone). In this manner, a given NPac vector defines a set of halftone parameters that can be used in the halftoning process to map a color to one or more NP vectors to be statistically distributed over the plurality of pixels for a halftone. Moreover, the statistical distribution of NPs to pixels in the halftone serves to control the colorimetry and other print characteristics of the halftone.

Spatial distribution of the NPs according to the probability distribution specified in the NPac vector may be performed using any suitable halftoning methods as is known in the art. In this respect, examples of suitable halftoning methods include matrix-selector-based PARAWACS (Parallel Random Area Weighted Area Coverage Selection) techniques and techniques based on error diffusion. An example of a printing system that uses area coverage representations for halftone generation is a Halftone Area Neugebauer Separation (HANS) pipeline.

Examples described herein relate to color calibration for printing based on NPacs, for example using a HANS pipeline. The color calibration may involve calibration of a color mapping from a device-dependent color space such as RGB or CMYK, for which a given color value may have a different perceived color when printed by different printing systems, to an NPac vector in an NPac space. Such examples will be described further below.

Figure 1:
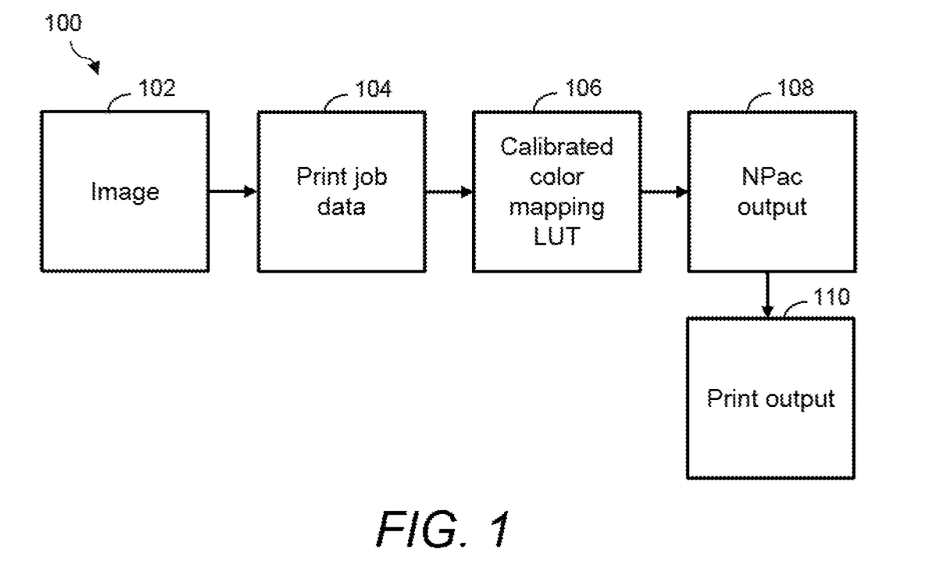
FIG. 1 is a schematic illustration of the use of an image processing pipeline for printing a print output using a printing system according to examples.

FIG. 1 shows schematically a printing system 100 that may be used for printing one or more colorants to produce a print output. Examples of colorants include inks, dyes, pigments, paints, toners and powders. For example, the printing system 100 may be used with a plurality of base color inks. Each base color ink may correspond with a different color coordinate or dimension of a given color space such as cyan, magenta, yellow and black for the CMYK color space, although other base color inks are possible. For example, the base color inks may correspond with other color inks, for example depending on the intended use of the printing system and the expected colors of the print outputs to be printed using the printing system.

Print job data 104 corresponding to an image 102 to be printed is sent to a print processor (not shown). The print processor processes the print job data 104. In the example of FIG. 1, the processing of the print job data 104 involves passing the print job data 104 to a color mapping look-up table 106. The color mapping look-up table 114 of FIG. 1 is a calibrated color-mapping look-up table, which may be obtained as described in further detail below. The print job data 104 may include input color data defined within an input color space, such as pixel representations in an RGB or CMYK color space, e.g. each pixel has a corresponding set of RGB or CMYK values. The color mapping look-up table 106 maps the input color data from the input color space to a Neugebauer primary area coverage (NPac) space, for example by mapping the input color data to NPac vectors in the NPac space. As noted above, NPac space is used as a domain within which a color mapping process and a halftoning process communicate, e.g. an output color is defined by an NPac value that specifies a particular area coverage of a particular colorant or ink combination. In the example of FIG. 1, a halftone image on a substrate includes a plurality of pixels or dots, the spatial density of the pixels or dots being defined in NPac space. The processing of the print job data 104 using the color mapping look-up table 106 therefore controls the colorimetry of an area of the image. For example, the halftoning process may simply implement the area coverages as defined in the NPac space, e.g. convert the probabilistic NPac vectors to realised print instructions for drops of colorant. This is represented in FIG. 1 by the NPac output 108. The processing of the print job data 104 to generate the NPac output 108 may be considered to form part of an image processing pipeline. An example image processing pipeline is described in further detail below with reference to FIG. 4.

The NPac output 108, which may be considered to correspond to print control data, is communicated to a printing device (not shown). The printing device in this example is arranged to use a plurality of base color inks to produce a print output 110 on a substrate. The printing system 100 and the printing device according to examples are described in further detail below with reference to FIG. 5. The substrate may be any two or three dimensional substrate. The print output 110 includes portions of the base color inks that are deposited onto the substrate by way of the printing device. In the example of FIG. 1, an area of the print output 110 may, depending on the print job data 104 representing the image 102 include a colorant or ink overprint, in that a portion of a first base color ink may be overprinted with a portion of at least a second base color ink. The print control data has defined values for depositions with each combination of the base color inks. In certain cases, the print control data may include a distribution vector that specifies a distribution of base color ink depositions, e.g. a probability distribution for each base color ink and/or base color ink combination for a pixel of a print image or, in other words, an area coverage vector for a set of base color ink combinations or overprints. The print control data may be processed via a halftoning stage such as PARAWACS or error diffusion as described above.

Figure 2:
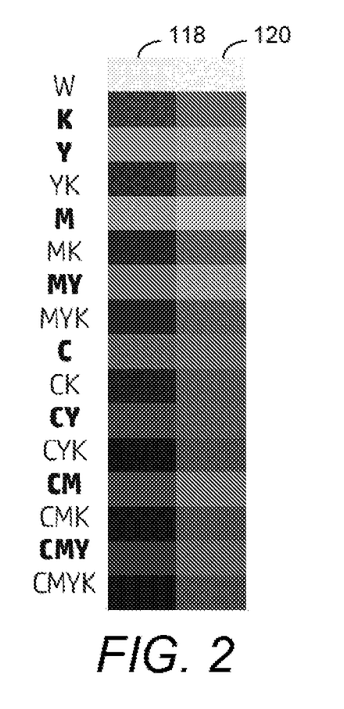
FIG. 2 illustrates Neugebauer primaries according to examples.

FIG. 2 shows a set of example NPs for CMYK base color inks. The left column 118 of FIG. 2 shows NPs printed at 100% of an ink limit and the right column 120 shows NPs printed at 50% of the ink limit. An ink limit is typically the upper or maximum amount of ink that can be printed locally with a given printing system. For example, the ink limit may correspond to a predetermined number of drops of ink of a predetermined drop weight, for example the maximum number of drops of ink that can be printed locally for ink of a minimum drop weight printable by the printing system. The smallest available drop weight may be expressed with respect to a nominal drop weight, which may be an expected or desired drop weight for printing. For example, the smallest or minimum available drop weight may be a certain proportion of the nominal drop weight, e.g. 90% of the nominal drop weight.

In some cases NPs may be printed below the ink limit, for example using less ink or with a lower coverage. The ink limit is generally a global value associated with the printing system. In an example printing system, the ink limit is 6 nanograms (ng) of ink per 1200 dots per inch (dpi) region or neighborhood. In other words, the printing system can print at most 6 ng of ink per 1200 dpi area. For a NP that uses 6 ng of ink, the NP can be printed at the ink limit at an area coverage of 100% using this example printing system. In this example, the NP printed at 50% of the ink limit would use 3 ng of ink and would correspond with an area coverage of 50%. However, in other examples, one or more of the NPs may correspond with a larger amount or quantity of ink than the ink limit. In these examples, the area coverage may be less than 100% or less than the proportion of the ink limit at which the ink is printed. For example, the printing system with the 6 ng ink limit would print a NP corresponding with 9 ng of ink at 66% coverage at the ink limit, as more than 66% coverage would correspond with more than 6 ng of ink, which would exceed the ink limit. The NPs may include a White or blank NP.

As can be seen from a comparison of the left and right columns 118, 120 of FIG. 2, the visual appearance of the NPs differs depending on the proportion of the ink limit at which the NPs are printed, with NPs printed at a higher proportion of the ink limit (in this case, 100%) appearing perceptually darker or less bright than NPs printed at a lower proportion of the ink limit (in this case, 50%). In this example, the NPs printed at the higher proportion of the ink limit correspond with a larger area coverage than the NPs printed at the lower proportion of the ink limit. The left and right columns 118, 120 of FIG. 2 can therefore be thought of as representing a system with a nominal drop weight (left column 118) and one that has a 50% reduction in drop weight (right column 120). Hence this Figure can be considered as illustrating why calibration would be necessary. For example, if the printing system is incorrectly calibrated to print an output based on NPacs for which the NPs of the NPac have a lower or higher coverage than intended, the output color may be quite different from a desired or intended color. Moreover, FIG. 2 illustrates that, in some cases, it may be desirable to derive calibration factors for NPs printed at different proportions of the ink limit. For example, the calibration factor may differ depending on the area coverage of the NP, which for example may correspond with the proportion of the ink limit at which the NP is printed at. By obtaining multiple calibration factors, for example corresponding with NPs printed at different proportions of the ink limit, the calibration may be more robust. The use of multiple calibration factors is discussed in more detail below.

Figure 3:
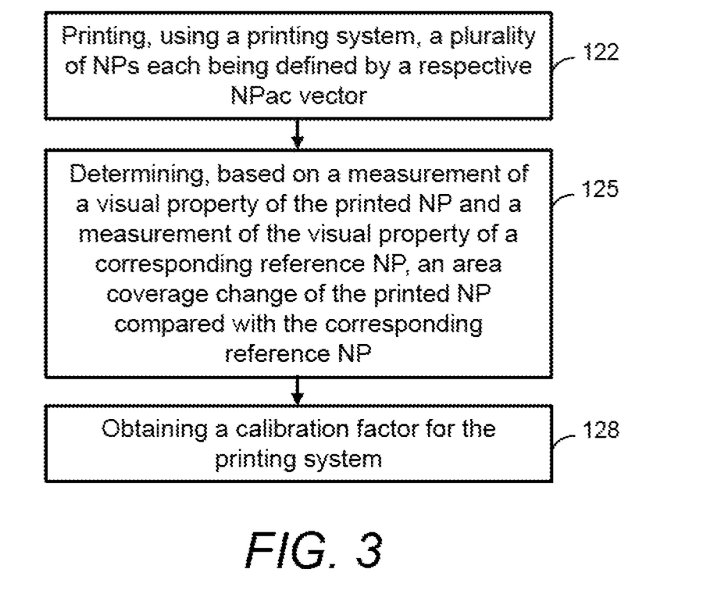
FIG. 3 is a flow diagram illustrating a method of obtaining a calibration factor according to examples.

FIG. 3 is a flow diagram illustrating a method of obtaining a calibration factor according to examples. The calibration factor obtained using the method of FIG. 3 can be used for color calibration of a printing system such as that of FIG. 1 or FIG. 5. The method of FIG. 3 includes, at block 122, printing, using the printing system, a plurality of NPs each being defined a respective NPac vector. In this way, the NPs are printed with a particular expected coverage as defined by the respective NPac vector so that the NPs can be compared against a reference that, if correctly calibrated, should have the same coverage as the printed NPs, to obtain the calibration factor. In other words, a printed NPac vector may be compared with a reference NPac vector to obtain the calibration factor.

The method further includes, for each of the NPs printed using the printing system, determining, based on a measurement of a visual property of the printed NP and a measurement of the visual property of a corresponding reference NP printed with a reference area coverage corresponding to the respective NPac, an area coverage change of the printed NP compared with the corresponding reference NP at block 125. The reference NPs are for example NPs printed under reference conditions, which may correspond with typical or expected printing conditions. For example, the visual property of the reference NPs may be obtained under reference conditions in a laboratory, in which the properties such as the drop weights printed by the printer pens or nozzles of the printing system are well known, or under declared reference conditions of a particular printing system, for example as indicated by a user of the system. The aim of the method of FIG. 3 may therefore be to calibrate the printing system so that the printed outputs of the printing system as calibrated closely replicate printed outputs that would be obtained using the printing system under the reference conditions.

The method of FIG. 3 further includes obtaining the calibration factor for the printing system based on the area coverage change for respective NPs of the plurality of NPs at block 128. The calibration factor can therefore be used to compensate for any change in the visual property of the NPs as printed compared with the reference NPs. In this way, the printing system can be calibrated so that content printed using the calibrated printing system looks similar to or the same as reference content printed under the reference conditions. The visual property of the printed NPs can be adjusted by adjusting the area coverage of the NPs as printed compared with the reference NPs. The area coverage of NPs printed after calibration of the printing system for a given NPac may have the same area coverage as the area coverage of the corresponding reference NPs, although in general the area coverage of the calibrated NPs may differ from that of the reference NPs due to the adjustment of the area coverage of the printed NPs to compensate for differences in area coverage of the printed NPs compared with the reference NPs (in order to compensate for a differing visual appearance of the printed NPs and the reference NPs). For example, where a given printing nozzle or pen is printing ink with a lower than expected drop weight, the NP printed using the ink from the given pen will be lighter than the corresponding reference NP printed under reference conditions in which the pen prints with the expected drop weight. In this case, for the NP as printed to have the same lightness as the reference NP, the area coverage of the NP must be increased so that the printed NP for a given NPac vector corresponds visually with the reference NP for the given NPac. In this case, a calibration factor that corresponds with an increase in the area coverage of the printed NP can be applied to the given NPac vector, for example to increase the coverage of that NP for that NPac. Thus, the method can be used to modify area coverages corresponding to each of a plurality of NPs. In an example in which an NPac includes two non-zero NPs, NP1 and NP2 at area coverages a1 and a2, the measurements of the visual properties of NP1 and NP2 indicate that NP1 is lighter than NP1 measured under reference conditions and that NP2 is darker than NP2 measured under the reference conditions. In this case, a1 can be increased to make NP1 as printed darker and a2 can be decreased to make NP2 as printed lighter. In this case, the NPac as printed can be adjusted to match or closely correspond to or replicate the corresponding NPac printed under the reference conditions. Methods in accordance with FIG. 3 can therefore be used to accurately calibrate the area coverage of NPs, meaning that such methods can be used for color calibration of printing pipelines in NP area coverage domains, such as a HANS pipeline. The method of FIG. 3 is explained in further detail with reference to FIG. 4.

Figure 4:
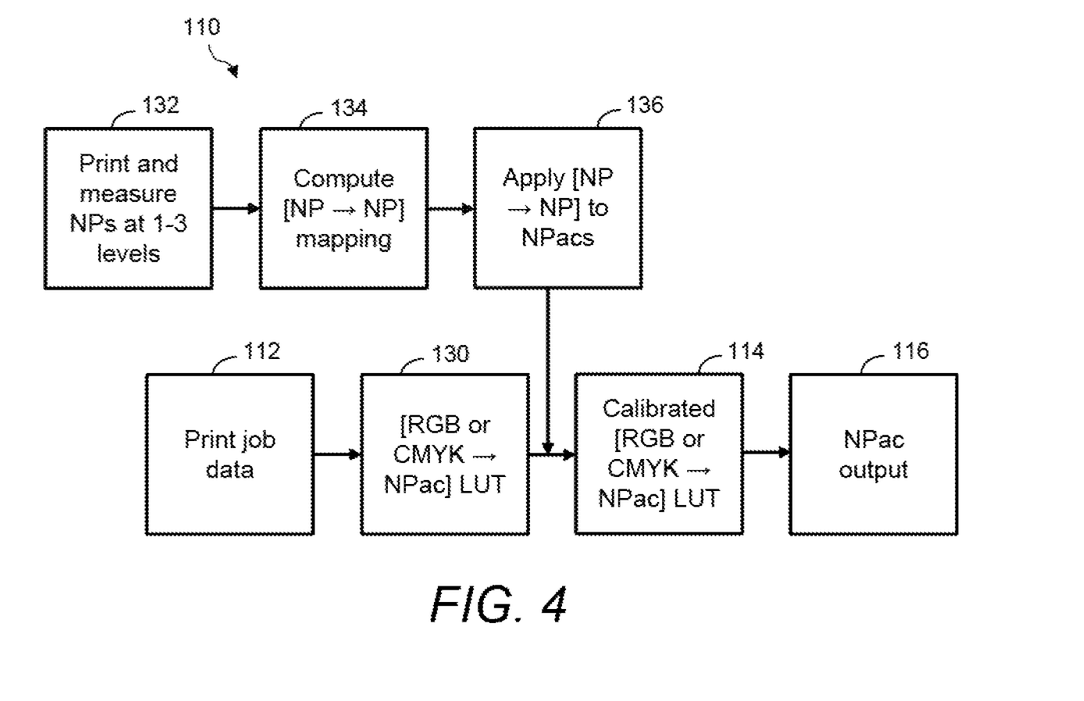
FIG. 4 is a schematic diagram illustrating the image processing pipeline included FIG. 1 in more detail.

FIG. 4 is a schematic diagram of an image processing pipeline 110 according to examples. The image processing pipeline 110 of FIG. 4 is the same as the image processing pipeline 110 of FIG. 1 but with further detail illustrated. Features of the image processing pipeline 110 of FIG. 4 that are the same as corresponding features of the image processing pipeline 110 of FIG. 1 are labelled using the same reference numeral; corresponding descriptions are to be taken to apply.

The image processing pipeline 110 of FIG. 4 can be used to obtain a calibration factor, for example as set out with reference to FIG. 3. The image processing pipeline 110 of FIG. 4 receives print job data 112. The print job data 112 is defined within an input color space. In examples such as that of FIG. 4, the input color space is a device-dependent color space. For example, an output color with a common value in the device-dependent color space may have a different perceived color when input to different printing systems. The RGB and CMYK color spaces are examples of device-dependent color spaces.

Figure 5:
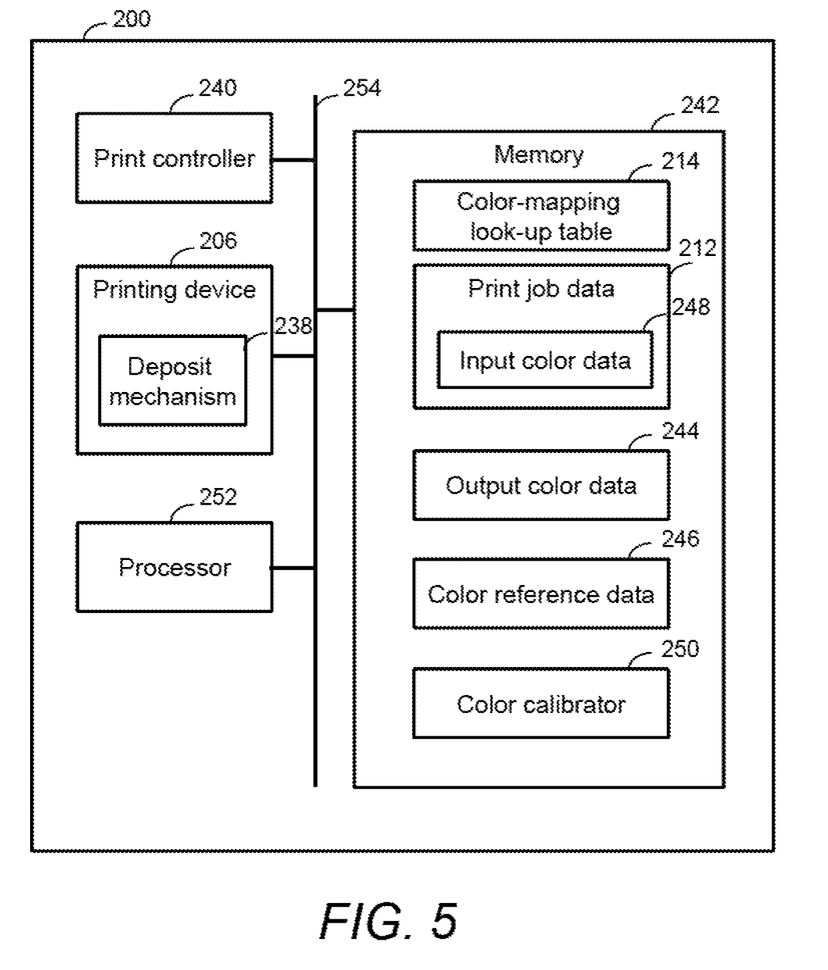
FIG. 5 is a schematic illustration showing a printing system according to examples.

The image processing pipeline 110 in the example of FIG. 4 includes a color-mapping look-up table 130 mapping colors, for example color values, from the input color space to a Neugebauer primary area coverage space. In examples such as FIG. 4, the color-mapping look-up table 130 is modified based on the calibration factor, generated for example using the method of FIG. 3, to generate a calibrated color-mapping look-up table 114. The NPac space is for example a device-independent color space such that the colors printed after color mapping using the calibrated color-mapping look-up table 114 will be visually the same regardless of the printing device they are printed by. The color values in the input color space, e.g. RGB or CMYK, may be mapped to NPac vectors in the Neugebauer primary area coverage space. Although FIG. 5 illustrates the print job data 112 being processed by the color-mapping look-up table 130 prior to calibration, in practice the print job data 112 may be processed by the calibrated color-mapping look-up table 114 without first being processed by the color-mapping look-up table 130.

The generation of the calibration factor is also illustrated in FIG. 4. In the example of FIG. 4, NPs are printed and measured at 1 to 3 coverage levels at block 132 (although NPs may also be printed and measured at more coverage levels in other examples). In examples such as this, the coverage levels correspond to respective proportions of the ink limit, with a higher coverage level corresponding to a higher proportion of the ink limit at which the NPs are printed. The NPs printed by the printing system may be all or a subset of possible NPs, or all or a subset of NPs in the color-mapping look-up table 130, for example. For example, the NPs printed by the printing system during generation of the calibration factor may be single-ink NPs, for example NPs based solely on or solely including ink of one color such as Cyan, Magenta, Yellow or Black for a CMYK printing system. The NPs are printed with an area coverage corresponding to a respective NPac. The NPs as printed should therefore provide a particular area coverage, although the measured area coverage may differ from the intended (or reference) area coverage. Where the NPs are printed at the ink limit, this may involve printing the maximum number of drops of ink that can be printed locally for ink of a minimum drop weight printable by the printing system. By printing the NPs for the smallest or lowest drop weights available for printing using the printing system, the NPs will be printed with the largest number of drops for a given area coverage. The calibration factor obtained can then be used to reduce area coverages, as will be explained further below. However, in other examples, the NPs may be printed using drops of ink with weights that are larger than the minimum drop weight printable by the printing system.

In cases in which the NPs are printed and measured for one area coverage level corresponding to a given NPac, such as a highest or largest available or 100% area coverage, there will be M ink patches printed and measured. Each printed ink patch will correspond with a different NP of M NPs. In other cases, NPs may be printed and measured for other area coverage levels, for example smaller or lower area coverages. For example, the NPs may be printed at a plurality of proportions of the ink limit, which each may correspond with a different area coverage level. If the NPs are printed and measured for N different area coverages or for N different proportions of the ink limit, there will be N×M patches that are printed and measured in total. For example, the image processing pipeline 110 may include printing a plurality of NPs at a first proportion of an ink limit of the printing system and printing the plurality of NPs at a second proportion of the ink limit, different from the first proportion. The plurality of NPs may be printed at the first and second proportion of the ink limit with the same ink drop weight, which may be the minimum available drop weight for the printing system.

The measurement of the NPs may include a measurement of a visual property of each of the NPs, such as at least one of a lightness of the respective NP or a spectral characteristic of the respective NP or the density or colorimetry of the respective NP. The visual property may be considered to be a color property of the NP, for example a value of a color parameter of a particular color space such as CIE LAB or CIE XYZ. Any suitable device may be used to measure the visual property of the NPs, as the skilled person will appreciate. For example, the luminance of the NPs may be measured using a luminance meter, the colorimetry with a colorimeter, spectral reflectance with a spectrophotometer, the density with a densitometer.

In examples such as FIG. 4, a measured area coverage of the one or more base color inks of the NP, for each of the NPs, is derived from the measurement of the visual property of the NP. For example, the measurement of the visual property of the NP may be converted to at least one of a colorimetric domain or the Yule-Nielsen modified colorimetric domain. The conversions follow standard practice, such as computing colorimetry from spectral reflectance via a standard illuminant (such as CIE D50) and a standard colorimetric observer (such as using the CIE 1931 color matching functions), or computing CIE LAB from CIE XYZ using the standard-defined equations, or applying the fractional exponent Yule-Nielsen factor to linear colorimetry to arrive at Yule-Nielsen modified non-linear colorimetry.

At block 134 in FIG. 4, an NP to NP area coverage mapping is computed. This NP to NP area coverage mapping may be used as the calibration factor or to derive the calibration factor. In examples, the calibration factor is derived based on an area coverage change for respective NPs of the plurality of NPs, which is for example determined based on a measurement of a visual property of the printed NP and of a reference NP corresponding to the same NPac as the printed NP. For example, the calibration factor may be calculated by calculating a function, such as a ratio, of the measured visual property for each of the printed NPs with respect to the measured visual property for each of the reference NPs. For example, where the visual property is lightness, the calibration factor for each NP may be calculated as a ratio of the measured lightness of the reference NP to the measured lightness of the corresponding printed NP. The calibration factor in this case represents an area coverage change that has occurred from the reference state to the current state that the printer is configured to print, although the area coverage change is not determined directly. In cases in which there are M NPs, the output of this calculation may be an M×1 vector of ratios, with one ratio per NP. Where there are N×M patches printed at N different area coverages or at N different proportions of the ink limit, a value indicative of the relative change in area coverage between the printed NPs and the reference NPs may be obtained by combining, for example by averaging, each of the calibration factors for the N different area coverages to generate a combined change or combined calibration factor, for each of the M NPs.

In general, the area coverage of the printed NPs is greater or larger than the area coverage of the reference NPs, for example due to dot gain. The printed NPs may therefore visually appear darker than intended. Thus, the ratio of the reference area coverages to the area coverages of the NPs as printed by the printing system may be in the range from 0 to 1. However, in some cases, the ratio may be above 1, with the area coverage of the printed NPs being lower than the reference area coverage of the reference NPs.

It is to be appreciated that the white or blank NP will not change from the reference NPs to the measured NPs. The white or blank NP for example corresponds with a blank medium or substrate, for example prior to ink being printed on the medium or substrate. Measurement of the blank NP can therefore used to ensure that the calibration is robust. For example, if the area coverage of the blank NP is determined to differ from the reference area coverage of the blank NP, for example based on measurements of the visual properties of the printed blank NP and the reference blank NP, then this can be taken as an indication that the visual property measurement is incorrect or that the incorrect reference is being used. The calibration process can then be adjusted accordingly.

The image processing pipeline 110 of FIG. 4 further includes applying the NP to NP area coverage mapping, which in this case corresponds with the calibration factor, to the NPac vectors. In this example, the calibration factor is used to modify the color mapping look-up table 130 by adjusting the area coverage of each NP in each of the NPac vectors in the look-up table in dependence on the calibration factor. This may be done by, for example, traversing all nodes of the look-up table 130, for example all of the NPac vectors in the table, and modifying each NPac according to the NP to NP area coverage mapping, which in this case corresponds with the per-NP calibration factor. Each NPac may be modified by altering the area coverage of the NPac proportionally to the drop-weight or area coverage change of each NP in the NPac, for example based on the measured change in the visual property from the reference NP to the corresponding printed NP. For example, where the measured NPs are determined to correspond to a larger drop weight or a larger area coverage than the reference NPs, the area coverage of the NPs corresponding to the NPacs of the color-mapping look-up table can be reduced appropriately.

In cases in which the area coverage of one or more of the NPs is reduced, the area coverage of the blank NP corresponding to a blank substrate may be increased. Conversely, in other cases, the area coverage of one or more of the NPs may be increased and the area coverage of the blank NP corresponding to the blank substrate may be decreased. For example, the area coverage of the blank NP may be adjusted as needed after the other NPs have had their area coverages adjusted such that the NPac based on the NPs is at 100% coverage. In some cases, the non-blank NPs' area coverages may be increased and the blank NP's area coverage may be decreased until there is no more blank medium coverage, in which case the halftone is fully populated by non-blank NPs.

In an illustrative example of a CMY printing system with a binary deposition mechanism (i.e. some ink/no ink) there are 8 NPs: [W, C, M, Y, CM, CY, MY, CMY] (where W indicates a blank substrate), an NPac can be represented by an 8-dimensional vector that has a value of between 0 and 1 at each dimension, such that the sum of the values is 1. A reference cyan NP is printed in accordance with a reference NPac of $NPac_{ref}=[0.2, 0.8, 0, 0, 0, 0, 0, 0]$. However, when this NP is printed corresponding to this NPac (i.e. with the blank substrate having a 20% area coverage and with the cyan ink having an 80% area coverage), the ratio of the lightness of the reference NP to the measured lightness of the printed NP is determined to be 0.9. In other words, the printed NP is measured to be darker than the reference NP. To compensate for this, the area coverage of the cyan NP can be reduced by multiplying the area coverage by this calibration factor, to give a calibrated NPac of $NPac_{cal}=[0.28, 0.72, 0, 0, 0, 0, 0, 0]$. In this example, the area coverage of the blank substrate is also adjusted so that the total area coverage of $NPac_{cal}$ sums to 1.

In examples, the output of the adjustment of the color-mapping look-up table 130 is the calibrated color-mapping look-up table 114, in which each NPac is modified by the NP to NP area coverage mapping, which may be in the form of a compensation table, such that the NPacs reflect the change in the NPs. In such examples, a calibration factor is obtained for each of the plurality of NPs as described above. Thus, each node of the calibrated look-up table 114 corresponding to a different NPac may be multiplied by a separate or different calibration factor for the NPs that contribute to that respective NPac.

A calibration factor may be obtained for each of the NPs used for the NPacs in the color-mapping look-up table 130. Thus, references herein to "a calibration factor" envisage that the calibration factor may include a plurality of factors each for a different NP. However, in some examples, at least some of the NPacs of the color-mapping look-up table 130 may be based on NPs other than the plurality of NPs. For example, an NP to NP area coverage mapping may be obtained for a subset of NPs and then used to obtain a calibration factor that can be applied for other, different, NPs. This can be used to reduce the number of NPs to be printed. In examples, the number of NPs printed and used for calibration can be selected based on a desired accuracy of the calibration (which may be increased by increasing the number of NPs used for the calibration) and what is considered to be an acceptable amount of printing for the printing system.

For example, the method may include determining an area coverage change for single-ink NPs and then using this to calibrate multi-ink Neugebauer primaries. In such cases, multi-ink NPs may be NPs that are based on or include inks of at least two different colors. The multi-ink NPs may be calibrated in various different ways. For example, if there is a fixed conversion between ink vectors (for example representing an amount or quantity of each base color ink) and NPacs, then a multi-ink NPac can be converted to an ink vector. The quantity of each single ink in the ink vector can be calibrated using the calibration factor obtained for the corresponding single-ink vector, for example by multiplying the quantity of each ink by the calibration factor. The ink vectors can then be converted back to multi-ink NPacs. In other examples, the calibration factor for the multi-ink NPacs may be obtained by extrapolating or interpolating the single-ink calibration factors to multi-ink NPacs.

In examples, the calibration factor may be a combined calibration factor based on a function of a respective calibration factor obtained for each of the plurality of NPs. For example, the combined calibration factor may be an average or mean ratio of the calibration factors obtained from the plurality of NPs. Then, this same combined calibration factor may be used to correct each of the NPacs or a subset of the NPacs, rather than correcting each NPac with a different calibration factor. This can allow calibration to be performed more quickly, while still improving the accuracy of the calibration compared with known calibration methods. For example, the combined calibration factor may be obtained from calibration factors of a few or a subset of all possible NPs, further speeding up the calibration. This approach can be used, for example, in situations in which lightness is more important than chroma and hue. In such situations, the improved accuracy may be sufficient for these purposes. Furthermore, by modifying the NPacs in this way, each of the modified NPacs, for example in the color-mapping look-up table, are consistent with each other, as this approach amounts to transitioning to or from blank media, which is typically native to every look-up table. The method according to examples therefore provides flexibility, as a simpler or faster calibration, suitable for calibrating in situations where lightness is relatively more important, can be used if required.

The print job data 112 defined within the input color space is converted to print color data defined with the Neugebauer primary area coverage space using the calibrated color-mapping look-up table 114 to obtain an NPac output 116.

The one or more base color inks corresponding to the NPac output 116 are printed, using the printing system, based on the print color data, for example based on the NPac vector. The spatial distribution of the base color inks corresponding to the NPs of the NPac output 116 may be performed using a suitable halftoning method as explained above.

By using the NP to NP area coverage mapping to correct or calibrate the mapping from the first color space to the NPac space, the calibration can compensate for ink interactions, as at least some of the NPs may correspond to a combination of inks of two or more different colors. Furthermore, relatively little printing and measuring may be required, for example, as the calibration can be obtained by printing a subset of available NPs, making the color calibration timely and efficient. The color calibration is also backward compatible with methods in which individual ink channels are calibrated, as it can be used to calibrate NPs that include one color, such as a primary color as explained above.

In addition, by using the method according to examples to generate a calibrated color-mapping look-up table, the calibration may be considered to be agnostic to the intended use of the look-up table. In other words, for a given medium or substrate, a single calibration, such as a single look-up table, can be used to calibrate a variety of different print modes, for example all available print modes. Furthermore, the method can be used to calibrate look-up tables with different interfaces, for example look-up tables to map colors from various different first color spaces, e.g. RGB or CMYK, to the NPac space. Use of the NPac space also enables the method according to examples to be used for a HANS separation process, which operates in NP area coverages. The method is also robust, as changes to the NPacs can be applied globally, for example using a combined calibration factor.

FIG. 5 is a schematic illustration showing a printing system according to examples. The printing system 200 of FIG. 5 may be similar to the printing system 100 of FIG. 1. Features of the printing system 200 of FIG. 5 similar to corresponding features of FIGS. 1 to 4 are labelled with the same reference numerals but incremented by 100; corresponding descriptions are to be taken to apply. The printing system 200 includes a printing device 206 to print a plurality of base color inks. The printing device 206 includes a deposit mechanism 238 to deposit drops of base color ink having a defined drop weight onto a print substrate. The deposit mechanism 238 for example includes an inkjet printer head or nozzle. The printing device 206 also includes a print controller 240 to receive print job data defined within an input color space and a memory 242. The memory 242 may include at least one of volatile memory, such as a random access memory (RAM) and non-volatile memory, such as read-only memory (ROM) or a solid state drive (SSD) such as Flash memory. The memory 242 in examples may include further storage devices, for example magnetic, optical or tape media, compact disc (CD), digital versatile disc (DVD) or other data storage media. The memory 242 may be removable or non-removable from the printing system 200. The printing device 206 may include the memory 242. The memory 242 includes a color-mapping look-up table 214, print job data 212, output color data 244 and color reference data 246. The print job data 212 is defined within an input color space and further includes input color data 248. The color-mapping look-up table 214 is for use in mapping the input color data 248 for the print job data 212 to generate the output color data 244. The output color data 244 is defined within an NPac space and is used to generate print instructions for the printing device 206.

In the example of FIG. 5, the memory 242 also includes a color calibrator 250. The color calibrator 250 is arranged to obtain visual property measurements for a plurality of NP test areas printed by the printing device 206. Each test area may be printed with an area coverage corresponding to a respective Neugebauer primary area coverage vector. The color calibrator 250 is further arranged to compute an NP area coverage mapping by comparing the visual property measurements to the color reference data 246 and apply the NP area coverage mapping to the color-mapping look-up table 214 to generate a calibrated color-mapping look-up table. In examples, the color-mapping look-up table 214 may be replaced by the calibrated color-mapping look-up table. The print controller 240 is configured to use the calibrated color-mapping look-up table to print the print job data using the printing device 206.

The color calibrator 250 in examples such as that of FIG. 5 is arranged to apply the NP area coverage mapping to the color-mapping look-up table by adjusting an area coverage of at least one NP corresponding to a respective NPac vector defined within the NPac color space in dependence on the NP mapping. For example, the color calibrator 250 of FIG. 6 may be used to implement the generation of the calibrated color-mapping look-up table 114 as described with reference to FIG. 4.

In the example of FIG. 5, the printing system 200 further includes a processor 252, which is communicatively coupled to the memory 242. The processor 252 in FIG. 5 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The color calibrator 250 may be in the form of computer program instructions, which may implement the color calibrator 250 when processed by the processor 252. The components of the printing system 200 in the example of FIG. 5 are interconnected using a systems bus 254. This allows data to be transferred between the various components.

Figure 6:
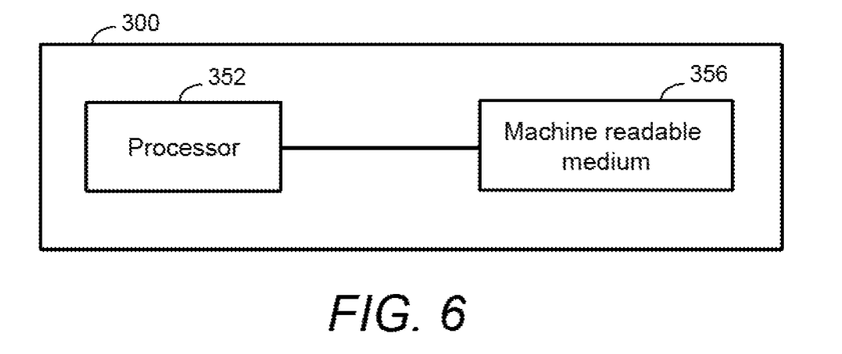
FIG. 6 is a schematic diagram of a printing system according to further examples.

Certain methods and systems as described herein, such as the printing system 200 of FIG. 5, may be implemented by a processor that processes computer program code that is retrieved from a non-transitory machine readable medium. A further example of such a system is illustrated in FIG. 6. The printing system 300 of FIG. 6 includes a non-transitory machine readable medium 356 coupled to a processor 352, which may be similar to the processor 252 of FIG. 5. In examples the printing system 300 includes a printing device (not shown). The non-transitory machine readable media 356 can be any media that can contain, store, or maintain programs and data for use by or in connection with an instruction execution system. Machine readable media can include any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 6, the non-transitory machine readable medium 356 includes instructions (not shown) which, when executed by a processor 352 of a printing system, cause the processor 352 to instruct a print of a plurality of test areas, each test area being associated with a Neugebauer primary from a set of available Neugebauer primaries for the printing system, each test area being defined by a respective Neugebauer primary area coverage vector. The non-transitory machine readable medium 356 may further include instructions to obtain measurement data indicative of lightness measurements for each of the printed test areas, obtain reference data for the set of available Neugebauer primaries and compute a calibration mapping for the set of available Neugebauer primaries by comparing the measurement data to the reference data. The non-transitory machine readable medium 356 may also include instructions to obtain a look-up table for the printing system, the look-up table including a plurality of nodes that map input print color data from an input color space to a Neugebauer primary area coverage space, dimensions of the Neugebauer primary area coverage space corresponding to at least the set of available Neugebauer primaries and apply the calibration mapping to calibrate the look-up table by modifying area coverage values for the set of available Neugebauer primaries for nodes of the look-up table. For example, a non-transitory machine readable medium such as the non-transitory machine readable medium 356 may include program code to implement the method of obtaining a calibration factor or color calibration according to any of the examples described above.

In further examples, the non-transitory machine readable medium 356 may include instructions to cause the processor 352 to convert the measurement data to normalized measurement data defined in an area-coverage linear domain, such as the Yule-Nielsen domain, before computing the calibration.

The preceding description has been presented to illustrate and describe examples of the principles described. This description is not intended to be exhaustive or to limit these principles to any precise form disclosed. Many modifications and variations are possible in light of the above teaching.

For example, as noted above, in some cases a subset of possible NPs is printed, for example the primary NPs or the primary NPs and a subset of secondaries and/or tertiaries. This may be sufficient to adequately determine other per-NP relationships. Printing and measuring a subset of NPs can be beneficial for printing systems with higher numbers of NPs, to reduce the number of printing and measuring steps.

As noted above, in some cases, the drop weight of the printing system is lower than for the reference, leading to lighter NPs than the reference. In such cases, and where the reference NP is already at 100% area coverage, with no blank media or substrate visible, additional NPs can be introduced in order to compensate for the lighter than intended printed NPs. For example, if at the lowest drop weight the reference NP for 100% coverage of one drop of cyan needs to be increased by 5% than the NPac based on this NP as calibrated can be made up of 95% one-drop cyan and 5% two-drop cyan.

What is claimed is:

1. A method of obtaining a calibration factor for color calibration of a printing system, the method comprising:

printing, using the printing system, a plurality of Neugebauer primaries each being defined by a respective Neugebauer primary area coverage vector;

for each of the Neugebauer primaries printed using the printing system:

determining, based on a measurement of a visual property for the printed Neugebauer primary and a measurement of the visual property for a corresponding reference Neugebauer primary corresponding to the respective Neugebauer primary area coverage vector, an area coverage change of the printed Neugebauer primary compared with the corresponding reference Neugebauer primary; and obtaining the calibration factor for the printing system based on the area coverage change for respective Neugebauer primaries of the plurality of Neugebauer primaries.

2. The method of claim 1, further comprising modifying a color-mapping look-up table for the printing system based on the calibration factor to generate a calibrated color-mapping look-up table, the color-mapping look-up table mapping colors from an input color space to a Neugebauer primary area coverage space based on the plurality of Neugebauer primaries.

3. The method of claim 2, wherein the color-mapping look-up table comprises a mapping of color values in the input color space to Neugebauer primary area coverage vectors in the Neugebauer primary area coverage space, and modifying the color-mapping look-up table comprises, for each Neugebauer primary area coverage vector of the color-mapping look-up table:

adjusting an area coverage of a Neugebauer primary corresponding to the respective Neugebauer primary area coverage vector in dependence on the calibration factor.

4. The method of claim 3, wherein the adjusting the area coverage of the Neugebauer primary corresponding to the respective Neugebauer Primary area coverage vector comprises:

reducing the area coverage of the Neugebauer primary and increasing the area coverage of a blank Neugebauer primary corresponding to a blank substrate, or increasing the area coverage of the Neugebauer primary and reducing the area coverage of the blank Neugebauer primary.

5. The method of claim 2, wherein the color-mapping look-up table comprises a mapping of color values in the input color space to Neugebauer primary area coverage vectors in the Neugebauer primary area coverage space, wherein a Neugebauer primary area coverage vector of the Neugebauer primary area coverage vectors is based on a Neugebauer primary other than the plurality of Neugebauer primaries.

6. The method of claim 2, further comprising:

receiving print job data defined within the input color space;

converting the print job data to print color data defined within the Neugebauer primary area coverage space using the calibrated color-mapping look-up table; and printing, using the printing system, one or more base color inks corresponding to a respective Neugebauer primary of the plurality of Neugebauer primaries according to the print color data.

7. The method of claim 1, wherein printing the plurality of Neugebauer primaries comprises printing the plurality of Neugebauer primaries at or below an ink limit.

8. The method of claim 1, wherein printing the plurality of Neugebauer primaries comprises:
 printing the plurality of Neugebauer primaries at a first proportion of an ink limit; and
 printing the plurality of Neugebauer primaries at a second proportion of the ink limit, different from the first proportion.

9. The method of claim 1, wherein the calibration factor comprises a calibration factor for each of the plurality of Neugebauer primaries, or
 the calibration factor is a combined calibration factor based on a function of a respective calibration factor obtained for each of the plurality of Neugebauer primaries.

10. The method of claim 1, wherein the plurality of Neugebauer primaries are each single-ink Neugebauer primaries.

11. The method of claim 1, wherein the visual property of each of the Neugebauer primaries comprises: a lightness of the respective Neugebauer primary, a density of the respective Neugebauer primary, or a spectral characteristic of the respective Neugebauer primary.

12. The method of claim 1, wherein printing a plurality of Neugebauer primaries comprises printing Neugebauer primaries at multiple different area coverage levels.

13. The method of claim 12, wherein each different area coverage level corresponds to a different proportion of an ink limit of the printing system.

14. The method of claim 1, wherein printing the plurality of Neugebauer primaries comprises printing the Neugebauer primaries at a minimum drop weight of the printing system.

15. The method of claim 1, wherein printing the plurality of Neugebauer primaries comprises printing the Neugebauer primaries with a largest number of drops per area available with the printing device.

16. A printing system comprising:
 a printing device to print a plurality of base color inks, the printing device comprising a deposit mechanism to deposit drops of base color ink having a defined drop weight onto a print substrate;
 a print controller to receive print job data defined within a first color space; and
 a memory comprising:
  a color-mapping look-up table to map input color data for the print job data to output color data defined within a Neugebauer primary area coverage space, said output color data being used to generate print instructions for the printing device,
  color reference data; and
 a color calibrator to:
  obtain visual property measurements for a plurality of Neugebauer primary test areas printed by the printing device with an area coverage corresponding to a respective Neugebauer primary area coverage vector;
  compute a Neugebauer primary area coverage mapping by comparing a difference between an area coverage value derived from the visual property measurements and a reference area coverage value from the color reference data for each Neugebauer primary test area; and
  apply the Neugebauer primary area coverage mapping to the color-mapping look-up table to generate a calibrated color-mapping look-up table, wherein the print controller is configured to use the calibrated color-mapping look-up table to print the print job data using the printing device.

17. The printing system according to claim 16, wherein the color calibrator is arranged to apply the Neugebauer primary area coverage mapping to the color-mapping look-up table by adjusting an area coverage of a Neugebauer primary corresponding to a respective Neugebauer primary area coverage vector defined within the Neugebauer primary area coverage space in dependence on the Neugebauer primary area coverage mapping.

18. A non-transitory machine readable medium comprising instructions which, when executed by a processor of a printing system, cause the processor to:
 instruct a print of a plurality of test areas, each test area being associated with a Neugebauer primary from a set of available Neugebauer primaries for the printing system, each test area being defined by a respective Neugebauer primary area coverage vector;
 obtain measurement data of a visual property for each of the printed test areas;
 deriving a printed area coverage from each measurement of the visual property;
 obtain reference data comprising a reference area coverage corresponding to each printed area coverage;
 compute a calibration mapping for the set of available Neugebauer primaries by comparing each printed area coverage to the corresponding reference area coverage;
 obtain a look-up table for the printing system, the look-up table comprising a plurality of nodes that map input print color data from an input color space to a Neugebauer primary area coverage space, dimensions of the Neugebauer primary area coverage space corresponding to the set of available Neugebauer primaries; and
 apply the calibration mapping to calibrate the look-up table by modifying area coverage values for the set of available Neugebauer primaries for nodes of the look-up table.

19. The non-transitory machine readable medium of claim 18, wherein the instructions cause the processor to:
 convert said measurement data to normalized measurement data defined in an area-coverage linear domain before computing the calibration mapping.

20. The non-transitory machine readable medium of claim 18, wherein the instructions to cause the processor to instruct the print of a plurality of test areas further comprises instructions to cause printing the test areas at a minimum drop weight of the printing system.

* * * * *